Patented Dec. 29, 1931

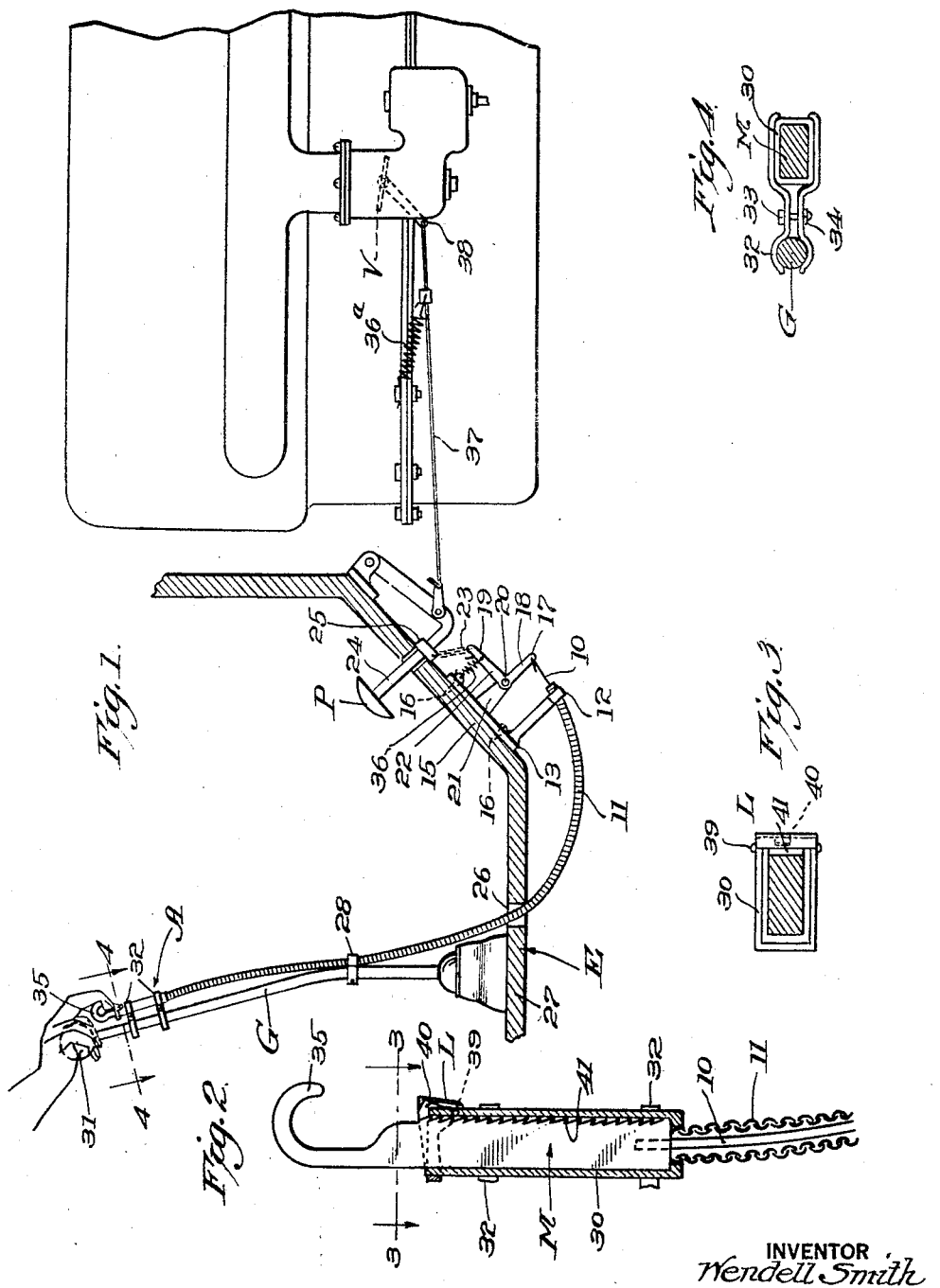

1,838,289

UNITED STATES PATENT OFFICE

WENDELL SMITH, OF PACIFIC PALISADES, CALIFORNIA

THROTTLE CONTROL DEVICE

Application filed May 15, 1928. Serial No. 277,994.

My invention relates generally to throttle control devices and more particularly to a throttle control device for actuating the throttle valve of an automobile engine.

It is the usual practice in throttle control devices of this character to provide a foot actuated means or accelerator pedal, and a hand actuated means mounted upon the steering post, each of the means being connected to the throttle valve. This arrangement of throttle control has many disadvantages such as, for example, when starting the vehicle upward from a standstill on a steep grade, as under this condition it is necessary that the engine either be accelerated by the hand throttle with one hand while employing the foot brake to prevent the vehicle from slipping backwards and utilizing the other hand to manipulate the gear shift lever, or by accelerating the engine with the accelerator pedal, while setting the hand brake to prevent slipping backward of the vehicle, and then manipulating the gear shift lever to effect the necessary change of gears. Both of these methods of controlling the vehicle on a steep grade consume time as well as require skill and practice to perform properly and without danger of the operator losing control of the vehicle or stalling its engine.

It is a purpose of my invention to provide an extremely simple, inexpensive and dependable throttle control device by which the above recited complex manipulation of the controls will be dispensed with, and the throttle valve rendered capable of being actuated by a hand of the operator while resting upon the gear shift lever as a support or during use of the hand to manipulate the gear shift lever in effecting shifting of the gears, to the end that both gear changing and engine controlling operations can be performed concurrently by one and the same hand of the operator with the utmost ease, or the engine controlled with the hand resting in a convenient position on the head of the gear shift lever.

It is thus rendered possible for the operator to brake the car with the foot when attempting to start from a standstill, upward on a steep grade, while accelerating the engine and shifting gears with one and the same hand, thereby greatly simplifying the operation and reducing to a minimum the possibility of the operator losing control of the vehicle or stalling the engine. Furthermore, by the provision of my throttle control device, the foot can be removed from the accelerator pedal and rested during long drives, the throttle valve being actuated solely by a hand of the operator while resting conveniently on the gear shift lever, thus leaving the foot of the operator entirely free for an instantaneous application of the brakes in an emergency or while driving in heavy traffic during which unexpected stops are sometimes necessary.

It is a further purpose of my invention to provide a throttle control device of the above described character by which the throttle valve is capable of being releasably retained or latched in any open position desired, and which is capable of being applied to a motor vehicle without modifying or disturbing the conventional throttle controls, as well as being capable of association with the conventional foot actuated control means, or employed independently of the controls to actuate the throttle valve.

I will describe only one form of throttle control device embodying my invention and will then point out the novel features in claims.

In the accompanying drawings,

Fig. 1 is a view showing in side elevation one form of throttle control device embodying my invention, applied to a motor vehicle;

Fig. 2 is an enlarged detail sectional view of a manually actuated operating means embodied in the device; and Figs. 3 and 4 are sectional views taken respectively on the lines 3—3 and 4—4 of Fig. 2.

Referring specifically to the drawings in which similar reference characters designate similar parts in each of the several views, my invention in its present embodiment comprises a manually operable actuating means for a conventional throttle valve V of a motor vehicle engine E, which means is designated generally at A and is associated with the usual gear shift lever G of the vehicle in such manner as to be capable of operation to actuate the throttle valve, by a hand of the operator while conveniently resting upon the gear shift lever or during manipulation of the lever in shifting the gears.

For the purpose of illustration, the actuating means A is shown operatively connected to the conventional accelerator pedal P to actuate the latter and hence the throttle valve V in the same manner as when employing the foot on the accelerator pedal, although the actuating means could be equally well connected directly to the throttle valve.

In its present embodiment the actuating means comprises a length of flexible wire 10 enclosed in a flexible tubing 11, one end of the tubing being secured to a post 12 formed on the base 13 of a bracket 14 secured at a point adjacent the pedal P to the underside of the inclined floorboards 15 of the vehicle by screws 16. The wire 10 projects from the secured end of the tubing 11 and is connected at 17 to the free end of one arm 18 of a bell crank lever 19 pivoted at 20 on an ear 21 formed on the bracket 14, while the other arm 22 of the bell crank lever is operatively connected to the pedal P by means of a short length of chain 23 attached to the stem 24 of the pedal by a clip 25 embracing the stem.

The other ends of the wire 10 and tubing 11 project through an opening 26 in the floorboard 27 adjacent the gear shift lever G and extend upwardly along the forward side of the lever, the tubing being secured against displacement from the lever by a clip 28.

The upper end of the wire 10 is secured to a manually actuated operating means or member M in the form of a flat rod slidably mounted in a casing or barrel 30 secured to the gear shift lever G at a point in close proximity to its ball head 31, by means of a pair of clamps 32 capable of being constricted to clamp the barrel and lever by screws 33 extending through the clamps and provided with nuts 34.

The upper end of the tubing 11 is secured to the lower end of the barrel 30 while the upper end of the member M projects from the barrel and is curved laterally to provide a hooked portion 35 which is so positioned with respect to the ball head 31 of the lever G, that with the palm of a hand of the operator resting upon the ball head 31, one or more fingers of the hand can be engaged with the hooked portion 35, so that by utilizing the ball head 31 as a fulcrum and pulling upwardly on the hooked portion 35, the member M will be drawn upwardly in the barrel 30 against the normal action of a spring 36 connected to the base 13 and to the arm 22 of the bell crank lever 19, to thus exert a pull upon the wire 10, all as clearly shown in Fig. 1.

Through the medium of the bell crank lever 19 and chain 23, it will be apparent that this pulling movement of the wire 10 will effect a depression or downward rocking of the pedal P, which movement is transmitted to the throttle valve V to open it against the normal urging action of a spring $36^a$, by means of a link 37 and an arm 38 which constitute convetional means for operatively connecting the pedal to the throttle valve.

It will be clear that the spring 36 operates through the bell crank lever 19, and wire 10, to normally urge the member M downwardly in the barrel 30 towards one extreme position, and that the spring $36^a$ operates through the link 37 and arm 38 to normally urge the throttle valve towards closed position. Thus, when the member M is drawn upwardly in the barrel by the operator towards its other extreme position, and thereby opens the throttle valve, the springs 36 and $36^a$ are placed under tension, so that upon a release of the member M, the springs will instantaneously restore the member to its lower extreme position and the throttle valve to closed position.

The member M can with equal facility be operated during manipulation of the gear shift lever G in shifting gears, as the ball head 31 of the lever can be grasped with sufficient firmness by certain fingers of the hand, to effect gear shifting movements of the lever, while other fingers of the hand are actuating the member to accelerate or decelerate the engine, thus permitting the speed of the engine to be controlled and the gears to be shifted concurrently and with one and the same hand.

During long drives the palm of the operator's hand may be rested conveniently on the head 31, and the throttle valve actuated by the fingers, the head 31 providing a firm support so that the throttle valve can be smoothly operated without the possibility of being unavoidably jerked as a result of vibration of the vehicle due to inequalities in the road, thus insuring a steady flow of fuel to the engine with the consequent smooth operation of the engine.

The member M can be releasably retained or latched in any one of a plurality of intermediate positions to accordingly maintain the throttle valve in any one of a plurality of respectively different open positions, so that the operator can remove his hand from the member and yet the throttle valve will be held open in the desired position against the normal action of the spring 36, to supply fuel to the engine.

To this end I provide in the present instance, a latching member L pivotally mounted on the barrel 30 at 39, and normally urged by a spring 40 out of engagement with teeth 41 formed along one side of the member M.

When it is desired to maintain the throttle open, the member M is pulled upwardly by the operator to the position in which the desired opening of the throttle is obtained, and the latching member L then rocked about its pivot into engagement with one of the teeth 41. While holding the latching member L in engagement with a tooth 41 the member M is released, and due to the ratchet form of the teeth, the latching member will be maintained in latching position against the normal action of its spring 40. However, it will be clear that by pulling the member M upward sufficiently to clear the latching member from the tooth with which it is engaged, the spring 40 will be free to act to restore the latching member to non-latching position, so that upon a release of the member M, it will immediately return to its lower extreme position and the throttle valve to closed position under the action of the springs 36 and 36ª respectively.

It will be clear that by virtue of the flexible connection formed by the chain 23, the accelerator pedal P can be operated in the usual manner without interference by the throttle control device embodying my invention.

Although I have herein shown and described only one form of throttle control device embodying my invention, it is to be understood that various changes and modifications may be made therein without departing from the spirit of the invention and the spirit and scope of the appended claims.

I claim:

1. A throttle control device comprising actuating means for a throttle valve, manually actuated operating means for the actuating means, means for mounting said operating means on a gear shift lever for movement by a hand of an operator, to actuate the first means and open or close the throttle valve according as the operating means is moved upwardly or downwardly on the gear shift lever, means for urging the operating means downwardly to effect closing movement of the throttle valve, and means for releasably retaining the operating means against downward movement under the action of the urging means in any one of a plurality of positions, to accordingly maintain the throttle valve in any of a plurality of respectively different open positions.

2. A throttle control device comprising actuating means for a throttle valve, a manually operable member for the actuating means, a barrel in which the member is slidably mounted to effect opening or closing movements of the throttle valve by the actuating means according as the member is moved to one extreme position or the other, means for securing the barrel to a gear shift lever in a position wherein the member is capable of being moved upwardly by the hand of an operator to the extreme position wherein opening movement of the throttle valve will be effected, and means for urging the member downwardly to its other extreme position.

3. A throttle control device comprising actuating means for a throttle valve, a manually operable member for the actuating means, a barrel in which the member is slidably mounted to effect opening or closing movements of the throttle valve by the actuating means according as the member is moved to one extreme position or the other, means for securing the barrel to a gear shift lever in a position wherein the member is capable of being moved upwardly by the hand of an operator to the extreme position wherein opening movement of the throttle valve will be effected, means for urging the member downwardly to its other extreme position, and means for releasably retaining the member against downward movement under the action of said urging means in any of a plurality of intermediate positions to accordingly maintain the throttle valve in any one of a plurality of open positions.

4. A throttle control device comprising actuating means for a throttle valve, a manually operable member for the actuating means, a barrel in which the member is slidably mounted to effect opening or closing movements of the throttle valve by the actuating means according as the member is moved to one extreme position or the other, means for securing the barrel to a gear shift lever in a position wherein the member is capable of being moved upwardly by the hand of an operator to the extreme position wherein opening movement of the throttle valve will be effected, means for urging the member downwardly to its other extreme position, and means for releasably retaining the member against downward movement under the action of said urging means in any of a plurality of intermediate positions to accordingly maintain the throttle valve in any one of a plurality of open positions, said last means comprising teeth on the member, and a latch mounted on the barrel and normally urged out of engagement with said teeth yet capable of being manually moved into latching engagement with the teeth.

5. A throttle control device comprising actuating means for a throttle valve, a manually operable member for the actuating means, a barrel in which the member is slidably mounted to effect opening or closing movements of the throttle valve by the actuating means according as the member is moved to one extreme position or the other, means for securing the barrel to a gear shift lever in a position wherein the member is capable of being moved by the hand of an operator to the extreme position wherein opening movement of the throttle valve will be effected, and means for urging the member to its other extreme position, said member having a hooked portion adapted to be engaged by fingers of the operator to actuate the member.

Signed at Los Angeles in the county of Los Angeles and State of California this 28th day of April A. D. 1928.

WENDELL SMITH.